United States Patent [19]

Knohl

[11] Patent Number: 5,244,325
[45] Date of Patent: Sep. 14, 1993

[54] FASTENER ASSEMBLY WITH AXIALLY SLIDABLE SLEEVE

[75] Inventor: Rudolph E. Knohl, Bartlett, Ill.

[73] Assignee: Elco Industries, Inc., Rockford, Ill.

[21] Appl. No.: 952,594

[22] Filed: Sep. 28, 1992

[51] Int. Cl.⁵ .................... F16B 21/18; F16B 39/00
[52] U.S. Cl. ................... 411/353; 411/107; 411/970; 411/999
[58] Field of Search ........... 411/105, 107, 109, 352, 411/353, 533, 970, 999

[56] References Cited

U.S. PATENT DOCUMENTS

| | | | |
|---|---|---|---|
| 3,138,188 | 6/1964 | Tuozzo et al. | 411/999 X |
| 3,204,680 | 9/1965 | Barry | 411/999 X |
| 3,221,794 | 12/1965 | Acres | 411/353 |
| 3,465,803 | 9/1969 | Ernest et al. | 411/999 X |
| 4,193,434 | 3/1980 | Wagner | |
| 4,238,165 | 12/1980 | Wagner | 403/408 |
| 4,732,519 | 3/1988 | Wagner | 411/999 X |
| 4,975,008 | 12/1990 | Wagner | 411/337 |
| 5,040,917 | 8/1991 | Camuffo | 411/353 X |

Primary Examiner—Neill R. Wilson
Attorney, Agent, or Firm—Leydig, Voit & Mayer, Ltd.

[57] ABSTRACT

A sleeve is slidable axially through a limited range along the shank of a threaded fastener. A resiliently yieldable retainer grips an unthreaded portion of the fastener shank and coacts with the adjacent end of the thread to captivate the sleeve against slipping axially off of the fastener.

14 Claims, 3 Drawing Sheets

FASTENER ASSEMBLY WITH AXIALLY SLIDABLE SLEEVE

BACKGROUND OF THE INVENTION

This invention relates generally to a threaded fastener assembly and, more particularly, to a fastener assembly of the type in which a sleeve is adapted to be preassembled with and captivated axially on the shank of a threaded fastener. Even more specifically, the invention relates to a special-use fastener assembly of the type in which the sleeve must be capable of moving axially along the shank through a limited range.

A fastener assembly of this general type is disclosed in Wagner U.S. Pat. No. 4,975,008. In that assembly, radially extending protuberances are formed integrally with the shank of the fastener. The sleeve is formed with a bead which engages the protuberances in order to retain the sleeve axially on the fastener. Because of the protuberances, special techniques are required to form the fastener.

In another type of fastener assembly, a knurl is formed between threaded and unthreaded sections of the shank of the fastener and serves to retain the sleeve axially. The knurl requires the fastener be specially formed and, in addition, the knurl sometimes fails and allows the sleeve to slip off of the end of the fastener.

SUMMARY OF THE INVENTION

The general aim of the present invention is to provide a new and improved fastener assembly of the above general type in which the sleeve is retained axially on the fastener in a unique manner enabling the use of a substantially standard and conventionally formed fastener.

A more detailed object of the invention is to achieve the foregoing by captivating the sleeve axially on the fastener with a resiliently yieldable retainer adapted to be assembled with the fastener after the sleeve has been assembled thereto.

The invention also resides in the provision of a uniquely shaped and dimensioned sleeve which coacts with the retainer to allow the sleeve to slide axially on the fastener without slipping off of the fastener.

These and other objects and advantages of the invention will become more apparent from the following detailed description when taken in conjunction with the accompanying drawings.

DETAILED DESCRIPTION OF THE PREFERRED EMBODIMENTS

Figure 1:
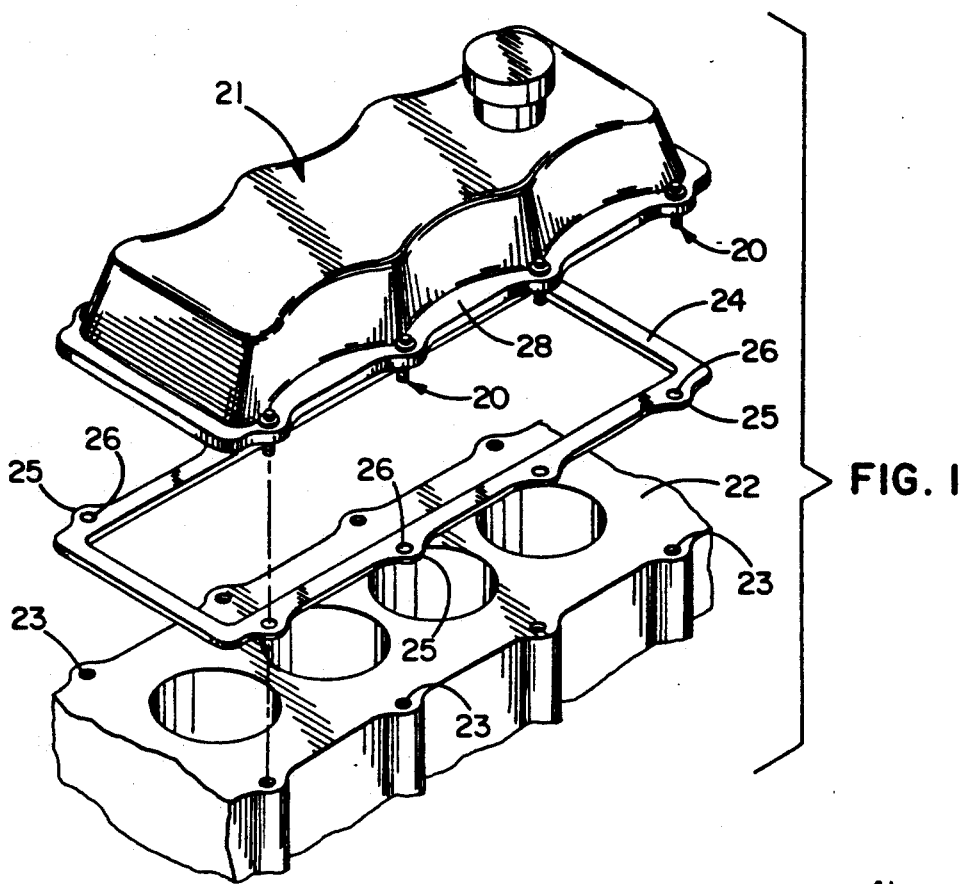
FIG. 1 is an exploded perspective view showing unique fastener assemblies of the present invention securing a rocker arm cover to an engine block.

For purposes of illustration, the invention has been shown in the drawings as incorporated in a threaded fastener assembly 20, there being a plurality of such assemblies shown in FIG. 1. In the specific application shown in FIG. 1, the fastener assemblies are used to secure a plastic rocker arm cover 21 to an engine block 22 having a plurality of tapped holes 23. The cover is adapted to be sealed to the block by a resiliently yieldable gasket 24 having ears 25 formed with apertures 26 aligned with the holes 23.

Each fastener assembly 20 is adapted to extend through a cylindrical hole 27 (FIG. 2) formed through a peripheral flange 28 at the lower side of the rocker arm cover 21. A counterbore 29 is formed at the upper end of the hole 27 while a somewhat shallower counterbore 30 is formed at the lower end of the hole.

In general, each fastener assembly 20 includes an elongated threaded fastener 35, a sleeve 36 telescoped over a portion of the fastener and an annular washer 37 encircling the upper end portion of the sleeve. The fastener includes an elongated shank 40 having a hexagonal driving head 41 and an integral flanged skirt 42 at its upper end. The lower end of the shank is formed with a dog-point tip 43. Immediately above the tip 43, the shank is formed with a threaded portion 45 defined by a helical thread. A substantial length 46 of the shank between the skirt 42 and the lower threaded portion 45 is unthreaded.

The sleeve 36 includes a main body portion 48, a radially outwardly extending flange 49 of substantial diameter at the upper end of the body portion, and an outwardly turned flange 50 of smaller diameter at the lower end of the body portion. The washer 37, which is made of plastic or rubber, encircles and grips the upper end portion of the body 48 of the sleeve 36 and engages the underside of the flange 49. The washer serves as a sound barrier and also serves to compensate for tolerance variations in order to control the magnitude of force exerted on the plastic cover 21 when the fastener 35 is tightened.

Figure 3:
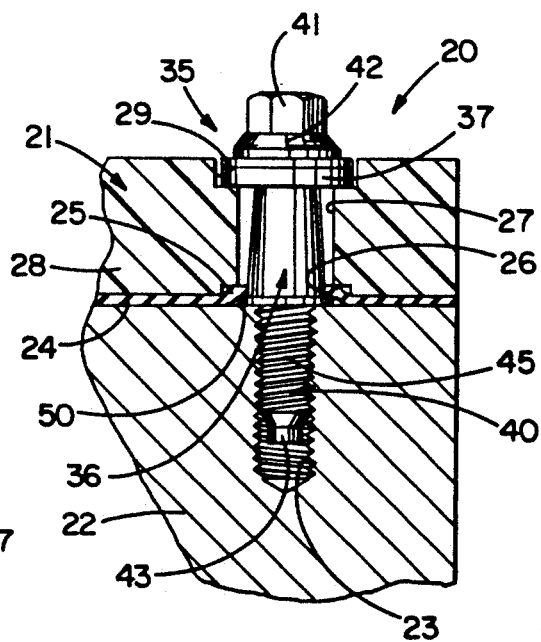
FIG. 3 is a view similar to FIG. 2 but shows the position of the fastener assembly after attachment of the cover to the block.
Figure 4:
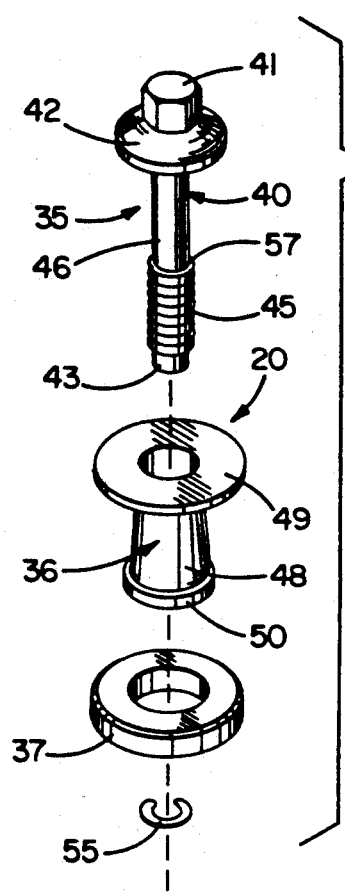
FIG. 4 is an exploded perspective view of the components of the fastener assembly.

In the installed position of the fastener assembly 20 as shown in FIG. 3, the threaded portion 45 of the fastener 35 is screwed into the tapped hole 23 in the engine block 22. The sleeve 36 is disposed in the hole 27 in the cover 21 and is located with its lower flange 50 inserted through the aperture 26 in the ear 25 of the gasket 24 and underlying the ear. The lower end of the flange 50 engages the upper side of the block 22. The washer 37 and the flange 49 are located in the upper counterbore 29. When the fastener 35 is tightened, the skirt 42 of the fastener bears against the flange 49 and causes the washer 37 to be pressed into engagement with the bottom of the counterbore 29.

Figure 2:
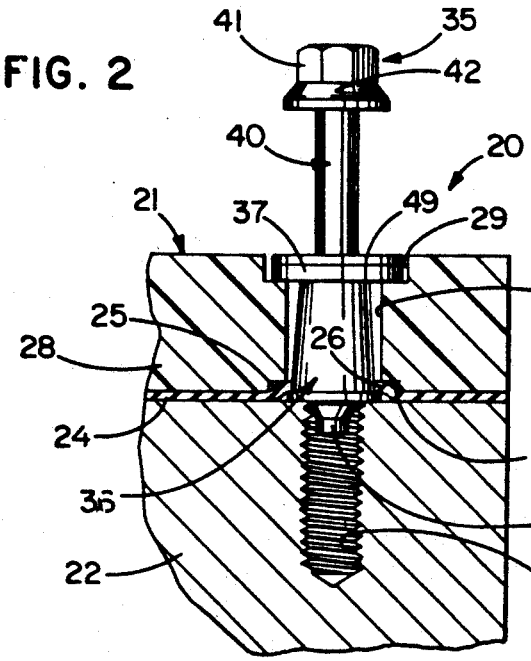
FIG. 2 is an enlarged elevational view, partly in section, and shows the position of a fastener assembly just prior to attachment of the rocker arm cover to the engine block.

Preparatory to final assembly of the cover 21 with the block 22, all of the fastener assemblies 20 are positioned as shown in FIG. 2. When so positioned, the tip 43 of each fastener 35 is piloted into the upper end of the hole 23 in the block, the sleeve 36 is located within the hole 27 in the cover 21, and the head 41 of the fastener is spaced a substantial distance above the cover. Automatic drivers (not shown) then engage and rotate the heads in order to screw the threaded sections 45 of the shanks 40 into the holes 23. During such driving, the shank 40 of each fastener moves downwardly within the sleeve 36 until the fastener is fully tightened. When the fastener is fully tightened, the extreme lower end of the sleeve 36 is approximately at the same level as the upper end of the thread 45.

Thus, it is necessary that the fastener 35 be capable of sliding axially within the sleeve 36. It is also desirable that all of the components of the fastener assembly 20 be preassembled after being manufactured so that the assembly may be packaged, shipped and installed as a unitary device. It is, therefore, necessary to captivate the sleeve 36 axially on the fastener 35 so as to hold the two together as a unitary assembly during shipment.

In accordance with the present invention, the sleeve 36 is uniquely configured and coacts in a novel manner with a retainer 55 (FIGS. 4–8) in order to enable the sleeve to slide axially relative to and yet be captivated axially on a fastener 35 which is essentially of standard construction and capable of being manufactured by conventional techniques. By virtue of the coaction of the sleeve 36 with the retainer 55, no special manufacturing procedures need be used in order to make the fastener 35.

In the present instance, the fastener 35 is formed by a conventional thread rolling operation and from a cold headed fastener blank with a cylindrical shank having a diameter $D_1$ (FIG. 7), which is the diameter of the unthreaded section 46 of the shank 40. When the thread is rolled onto the lower section 46, the major or crest diameter $D_2$ (FIG. 6) of the thread 45 takes on a dimension which is somewhat greater than the diameter $D_1$ of the unthreaded section 46. As a result, an upwardly facing shoulder 57 of diameter $D_2$ is defined by the upper end of the thread and is located at the junction of the threaded and unthreaded sections 45 and 46.

Figure 9:
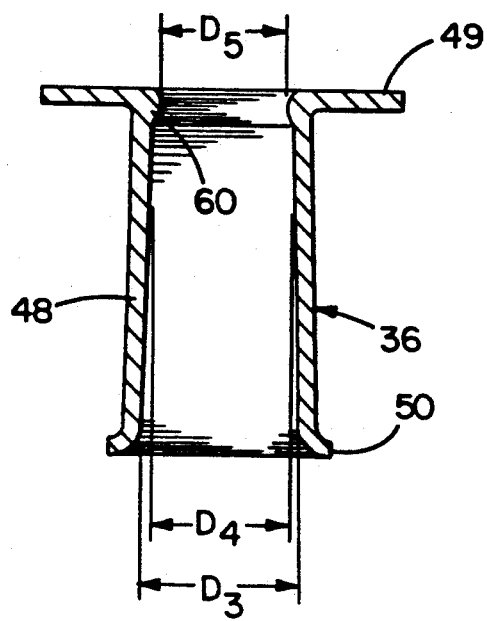
FIG. 9 is an enlarged axial cross-sectional view of the sleeve of the fastener assembly.

Pursuant to the invention, the sleeve 36 is formed such that its inner diameter is greater at the lower end of the sleeve than at the upper end of the sleeve. In the embodiment shown in FIGS. 1–9, this is achieved by forming the body 48 of the sleeve in the shape of a frustum having a relatively large inner diameter $D_3$ (FIG. 9) at its lower end and tapering upwardly to a smaller inner diameter $D_4$ at its upper end. Immediately above the small diameter $D_4$ of the frustum, the sleeve 36 is formed with a radially inwardly projecting bead 60 having an inner diameter $D_5$ smaller than the diameter $D_4$. The diameters $D_3$, $D_4$ and $D_5$ all are larger than the major diameter $D_2$ of the thread on the threaded section 45 of the shank 40. As a result, the sleeve 36 (with the washer 37 preassembled thereto) may be slipped onto the shank 40 from the tip end 43 thereof and may slide freely up the shank until the flange 49 engages the skirt 42.

In the embodiment of the invention shown in FIGS. 1–9, the retainer 55 for captivating the sleeve 36 axially on the fastener 35 is a generally C-shaped clip made out of resiliently yieldable material. Herein, the clip 55 is made of round spring wire and has a relaxed inner diameter less than the outer diameter $D_2$ of the shoulder 57 defined by the end of the thread 45 and preferably less than the diameter $D_1$ of the unthreaded portion 46 of the shank 40. The outer diameter $D_6$ (FIG. 8) of the clip 55 is smaller than the diameter $D_3$ at the lower end of the sleeve 36, is approximately equal to the diameter $D_4$ at the upper end of the sleeve and is substantially larger than the diameter $D_5$ of the bead 60.

After the sleeve 36 has been assembled with the fastener 35, the clip 55 is installed on the shank 40 in order to captivate the sleeve against slipping off of the tip end 43 of the shank. The clip may be installed by forcibly pushing the clip axially along the threaded portion 45 of the shank as permitted by the resiliency of the clip. When the clip moves upwardly past the shoulder 55 defined by the upper end of the thread, the clip tends to spring back to its relaxed condition and, in so doing, contracts around and grips the unthreaded portion 46 of the shank 40. The shoulder 57 prevents the clip 55 from moving reversely along the shank 40 toward the tip 43 thereof unless an extremely high axial force is applied to the clip.

Alternatively, the clip 55 may be installed on the fastener 35 in the manner of a nut by turning the fastener while holding the clip against rotation. During turning of the fastener, the clip threads upwardly along the threaded portion 45 of the shank 40 and then passes upwardly past and is captivated axially by the shoulder 57.

Figure 5:
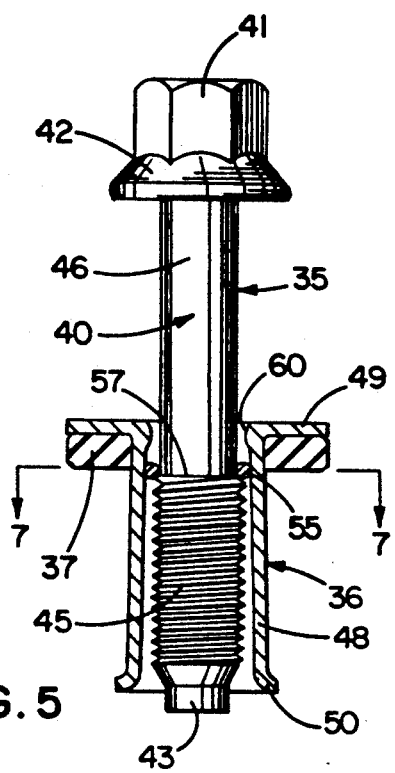
FIGS. 5 and 6 are enlarged views of the fastener assembly in the positions shown in FIGS. 2 and 3, respectively, portions of the fastener assembly being broken away and shown in section.
Figure 6:
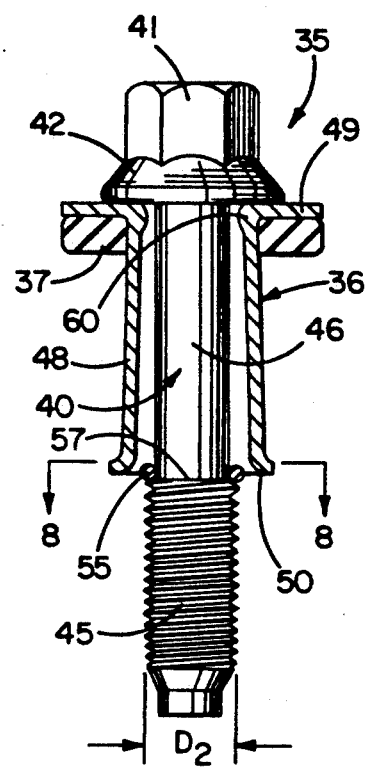
Figure 7:
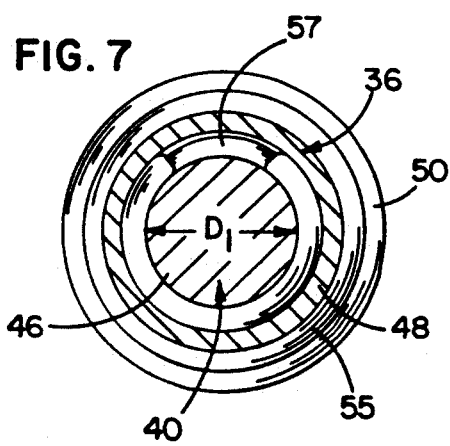
FIG. 7 is an enlarged cross-section taken along the line 7—7 of FIG. 5.
Figure 8:
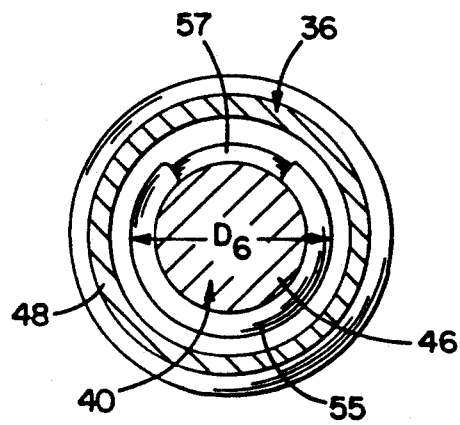
FIG. 8 is an enlarged cross-section taken along the line 8—8 of FIG. 6.

When the clip 55 is in its installed position, it permits the sleeve 36 to slide upwardly and downwardly between the positions shown in FIGS. 5 and 6 due to the relationship between the outer diameter $D_6$ of the clip and the diameters $D_3$ and $D_4$ of the inner side of the sleeve. When the sleeve is in the position shown in FIG. 5, the diameter $D_4$ of the sleeve prevents the clip from opening up and expanding to a size where its inner diameter is greater than the diameter $D_2$ of the shoulder 57. Downward sliding of the sleeve 36 off of the fastener 35 is prevented by virtue of the relatively small diameter bead 60 engaging the radially constrained clip. Thus, the clip permits free up and down sliding of the sleeve through a limited range while captivating the sleeve on the fastener during shipment and prior to final driving of the fastener.

It will be noted that the length of the unthreaded portion 46 of the shank 40 is approximately equal to the length of the sleeve 36. As a result, fully formed threads are located adjacent the lower flange 50 of the sleeve to provide enhanced strip-out resistance when the fastener 35 is screwed into a relatively thin sheet metal part.

Figure 10:
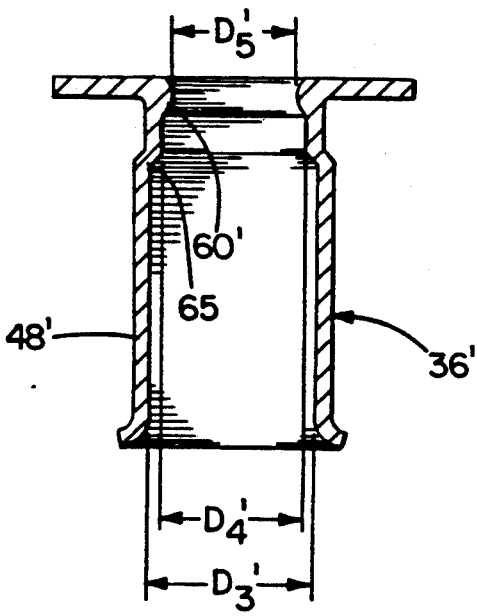
FIG. 10 is a view similar to FIG. 9 but shows a modified sleeve.

A modified sleeve 36' is shown in FIG. 10. In this sleeve, a substantial length of the body 48' is cylindrical and is of relatively large diameter $D_3'$. A short frusto-conical section 65 is formed at the upper end of the cylindrical section and tapers upwardly to a smaller diameter $D_4'$. As before, a bead 60' of still smaller diameter $D_5'$ is located at the extreme upper end of the sleeve. When the diameter $D_4'$ encounters the clip, it constrains the clip radially and prevents the clip from being expanded and opened up by the axial force exerted by the bead 60'.

Figure 11:
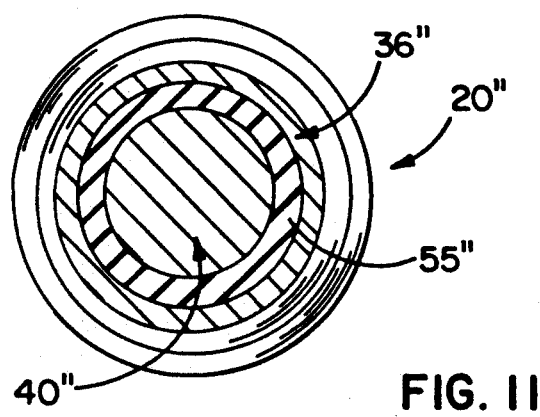
FIG. 11 is a view similar to FIG. 7 but shows a fastener assembly with a modified retainer.

FIG. 11 shows a fastener assembly 20" with a modified retainer 55". In this instance, the retainer is a full circular ring made of rubber, plastic or other resiliently yieldable material. When the ring is relaxed, its inner diameter is smaller than the major diameter $D_2$ of the thread. When the ring is installed in a position similar to that shown in FIG. 6, its outer diameter is smaller than the diameter $D_3$, is approximately equal to the diameter D4, and is larger than the diameter D5 of the sleeve 36. The ring 55" may be installed in the same manner as the clip 55.

From the foregoing, it will be apparent that the present invention brings to the art a new and improved fastener assembly in which a retainer enables a sleeve to slide through a limited range along the shank of the fastener while captivating the sleeve axially on the fastener. By virtue of the retainer, the fastener may be manufactured by a conventional thread rolling process and need not itself be formed with any special means for captivating the sleeve.

I claim:

1. A fastener comprising an elongated shank having a first end with an enlarged driving head and having a second and opposite tip end, said shank having an unthreaded section of predetermined diameter extending a predetermined distance along said shank from the first end thereof, said shank having a threaded section with a helical thread extending along said shank from the unthreaded section of said shank toward the tip end thereof, the major diameter of said thread being greater than the diameter of said unthreaded section, there being a shoulder defined by the junction of the threaded and unthreaded sections of said shank, said shoulder facing toward the first end of said shank and having an outer diameter greater than the diameter of said unthreaded section, a sleeve having a first end located adjacent the first end of said shank and having a second and opposite end, the inner diameter of said sleeve adjacent the first end thereof being less than the inner diameter of said sleeve adjacent the second end thereof and being greater than the outer diameter of said shoulder whereby said sleeve may be slipped onto said shank from the tip end thereof and may be slipped past said shoulder and onto the unthreaded section of said shank, the inner diameter of said sleeve progressively decreasing as said sleeve proceeds from the second end thereof toward the first end thereof, and a resiliently yieldable retainer around at least a portion of the unthreaded section of said shank and having an inner diameter and an outer diameter, the inner diameter of said retainer being less than the outer diameter of said shoulder whereby said shoulder engages said retainer to prevent said retainer from moving from the unthreaded portion of said shank onto the threaded portion thereof, and the outer diameter of said retainer being less than the inner diameter of said sleeve adjacent the second end thereof and greater than the inner diameter of said sleeve adjacent the first end thereof whereby said sleeve is free to slide back and forth on said shank but is captivated against slipping off of said shank by virtue of the first end of said sleeve engaging said retainer.

2. A fastener as defined in claim 1 in which an annular bead extends radially inwardly from said sleeve adjacent the first end thereof.

3. A fastener as defined in claim 1 in which the relaxed inner diameter of said retainer is less than the diameter of said unthreaded section of said shank whereby said retainer resilient grips said unthreaded section.

4. A fastener comprising an elongated shank having an upper end with an enlarged driving head and having a lower tip end, said shank having an upper unthreaded section of predetermined diameter and having a lower threaded section immediately adjacent said unthreaded section, said threaded section having a helical thread with a major diameter greater than the diameter of the unthreaded section whereby the upper end of the thread defines an upwardly facing shoulder of predetermined outer diameter at the junction of the threaded and unthreaded sections, a sleeve having upper and lower ends, the inner diameter of said sleeve adjacent the upper end thereof being less than the inner diameter of the sleeve adjacent the lower end thereof and being greater than the outer diameter of said shoulder whereby said sleeve may be slipped upwardly onto said shank from the tip end thereof and may be slipped upwardly past said shoulder and onto the unthreaded section of said shank, a portion of the inner side of said sleeve defining a frustum which tapers in diameter upon progressing from the lower end of said sleeve toward the upper end thereof, there being an annular bead projecting radially inwardly from said sleeve immediately above the upper end of said frustum, and a resiliently yieldable retainer around at least a portion of the unthreaded section of said shank and having an inner diameter and an outer diameter, the inner diameter of said retainer being less than the outer diameter of said shoulder whereby said shoulder engages said retainer to prevent said retainer from moving downwardly from the unthreaded portion of said shank onto the threaded portion thereof, and the outer diameter of said retainer being less than the inner diameter of said sleeve adjacent the lower end thereof and greater than the inner diameter of said sleeve adjacent the upper end thereof whereby said sleeve is free to slide upwardly and downwardly on said shank but is captivated against slipping downwardly off of said shank by virtue of the upper end of said sleeve engaging said retainer.

5. A fastener as defined in claim 4 in which the inner diameter of said retainer is less than the diameter of the unthreaded section of said shank when said retainer is in a relaxed condition whereby said retainer resiliently grips said unthreaded section.

6. A fastener as defined in claim 5 in which said retainer is a generally C-shaped clip made of resiliently yieldable material.

7. A fastener as defined in claim 5 in which said retainer is a circular ring made of resiliently yieldable material.

8. A fastener comprising an elongated shank having a first end with an enlarged driving head and having a second and opposite tip end, said shank having an unthreaded section of predetermined diameter extending a predetermined distance along said shank from the first end thereof, said shank having a threaded section with a helical thread extending along said shank from the unthreaded section of said shank toward the tip end thereof, the major diameter of said thread being greater than the diameter of said unthreaded section, there being a shoulder defined by the junction of the threaded and unthreaded sections of said shank, said shoulder facing toward the first end of said shank and having an outer diameter greater than the diameter of said unthreaded section, a sleeve having a first end located adjacent the first end of said shank and having a second and opposite end, the inner diameter of said sleeve adjacent the first end thereof being less than the inner diameter of said sleeve adjacent the second end thereof and being greater than the outer diameter of said shoulder whereby said sleeve may be slipped onto said shank from the tip end thereof and may be slipped past said shoulder and onto the unthreaded section of said shank, and a resiliently yieldable retainer around at least a portion of the unthreaded section of said shank and having an inner diameter and an outer diameter, the relaxed inner diameter of said retainer being less than the diameter of said unthreaded section of said shank whereby said retainer resiliently grips said unthreaded section, the inner diameter of said retainer being less than the outer diameter of said shoulder whereby said shoulder engages said retainer to prevent said retainer from moving from the unthreaded portion of said shank onto the threaded portion thereof, and the outer diameter of said retainer being less than the inner diameter of said sleeve adjacent the second end thereof and greater than the inner diameter of said sleeve adjacent the first end thereof whereby said sleeve is free to slide back and forth on said shank but is captivated against slipping off of said shank by virtue of the first end of said sleeve engaging said retainer.

9. A fastener as defined in claim 8 in which the inner diameter of said sleeve progressively decreases as said sleeve proceeds from the second end thereof toward the first end thereof.

10. A fastener as defined in claim 8 in which the inner diameter of said sleeve is substantially constant along a substantial length of said sleeve as said sleeve progresses from the second end thereof to a predetermined location, the inner diameter of said sleeve progressively decreasing as said sleeve proceeds from said predetermined location toward the first end of said sleeve.

11. A fastener as defined in claim 10 in which an annular bead extends radially inwardly from said sleeve adjacent the first end thereof.

12. A fastener as defined in claim 8 in which said retainer is a generally C-shaped clip made of resiliently yieldable material.

13. A fastener as defined in claim 8 in which said retainer is a circular ring made of resiliently yieldable material.

14. A fastener comprising an elongated shank having a first end with an enlarged driving head and having a second and opposite tip end, said shank having an unthreaded section of predetermined diameter extending a predetermined distance along said shank from the first end thereof, said shank having a threaded section with a helical thread extending along said shank from the unthreaded section of said shank toward the tip end thereof, the major diameter of said thread being greater than the diameter of said unthreaded section, there being a shoulder defined by the junction of the threaded and unthreaded sections of said shank, said shoulder facing toward the first end of said shank and having an outer diameter greater than the diameter of said unthreaded section, a sleeve having a first end located adjacent the first end of said shank and having a second and opposite end, the inner diameter of said sleeve adjacent the first end thereof being less than the inner diameter of said sleeve adjacent the second end thereof and being greater than the outer diameter of said shoulder whereby said sleeve may be slipped onto said shank from the tip end thereof and may be slipped past said shoulder and onto the unthreaded section of said shank, the inner diameter of said sleeve being substantially constant along a substantially predetermined length of said sleeve as said sleeve progresses from the second end thereof to a predetermined location, the inner diameter of said sleeve progressively decreasing and defining a taper as said sleeve proceeds from said predetermined location toward the first end of the sleeve, and a resiliently yieldable retainer around at least a portion of the unthreaded section of said shank and having an inner diameter and an outer diameter, the inner diameter of said retainer being less than the outer diameter of said shoulder whereby said shoulder engages said retainer to prevent said retainer from moving from the unthreaded portion of said shank onto the threaded portion thereof, and the outer diameter of said retainer being substantially less than the inner diameter of said sleeve along said predetermined length thereof and being greater than the inner diameter of said sleeve adjacent said taper whereby said sleeve is free to slide back and forth on said shank but is captivated against slipping off of said shank by virtue of said taper engaging said retainer and preventing said retainer from expanding radially and slipping past said shoulder.

* * * * *